US012675960B2

(12) United States Patent
Fang et al.

(10) Patent No.: US 12,675,960 B2
(45) Date of Patent: Jul. 7, 2026

(54) SECURITY PROMPT METHOD AND APPARATUS, STORAGE MEDIUM, DEVICE, AND PROGRAM PRODUCT

(71) Applicant: Beijing Zitiao Network Technology Co., Ltd., Beijing (CN)

(72) Inventors: Chi Fang, Beijing (CN); Mengqian Liu, Beijing (CN); Jia Guo, Beijing (CN); Rongxuan Mu, Beijing (CN); Shuo Liu, Beijing (CN); Chin-Wei Liu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/999,219

(22) Filed: Dec. 23, 2024

(65) Prior Publication Data

US 2025/0218136 A1     Jul. 3, 2025

(30) Foreign Application Priority Data

Dec. 27, 2023     (CN) .......................... 202311824924.9

(51) Int. Cl.
| | |
|---|---|
| *G06F 3/01* | (2006.01) |
| *G06T 7/00* | (2017.01) |
| *G06T 7/11* | (2017.01) |
| *G06T 7/60* | (2017.01) |
| *G06T 19/00* | (2011.01) |

(52) U.S. Cl.
CPC ............ *G06T 19/006* (2013.01); *G06F 3/011* (2013.01); *G06T 7/0002* (2013.01); *G06T 7/11* (2017.01); *G06T 7/60* (2013.01); *G06T 2210/21* (2013.01)

(58) Field of Classification Search
CPC ....... G06T 19/006; G06T 7/0002; G06T 7/11; G06T 7/60; G06T 2210/21; G06T 7/73; G06T 2207/30244; G06F 3/011
See application file for complete search history.

(56) References Cited

U.S. PATENT DOCUMENTS

| | | | |
|---|---|---|---|
| 2017/0220863 A1* | 8/2017 | Lection | G06V 20/58 |
| 2023/0237797 A1* | 7/2023 | Doken | G06T 11/00 |
| | | | 345/633 |
| 2024/0012491 A1* | 1/2024 | Torres | G06F 3/04815 |
| 2024/0155093 A1* | 5/2024 | Pohl | H04N 13/271 |

FOREIGN PATENT DOCUMENTS

CN          115047977 A      9/2022

* cited by examiner

*Primary Examiner* — Premal R Patel
(74) *Attorney, Agent, or Firm* — Alleman Hall LLP

(57) ABSTRACT

The present application discloses a security prompt method and apparatus, a storage medium, a device, and a program product. The method includes: acquiring environmental data of a physical environment; obtaining pose data of a user; classifying entities in the physical environment into danger levels based on the environmental data and the pose data; and presenting a visual indication for security warning when a distance between a collider and a target entity belonging to a target danger level reaches a danger distance threshold, where the collider is constructed based on an interactor corresponding to the user.

20 Claims, 4 Drawing Sheets

SECURITY PROMPT METHOD AND APPARATUS, STORAGE MEDIUM, DEVICE, AND PROGRAM PRODUCT

CROSS REFERENCE TO RELATED APPLICATIONS

The present application is based on and claims priority to Chinese Patent Application No. 202311824924.9 filed on Dec. 27, 2023, the disclosure of which is incorporated by reference herein in its entirety.

TECHNICAL FIELD

The present application relates to the field of extended reality (XR) technologies, and in particular, to a security prompt method and apparatus, a storage medium, a device, and a program product.

BACKGROUND

At present, extended reality (XR) technologies are applied to more and more scenarios, which specifically includes virtual reality (VR), augmented reality (AR), mixed reality (MR), and the like. After wearing XR equipment and entering a virtual interactive scene, a user's perception of the surrounding real environment is reduced, and the user is prone to collide with surrounding real objects. In MR experience, a security area is generally set to ensure the safety of an experiencer. The security area aims to prevent the experiencer from being injured due to excessive and intense actions or accidental collisions in the immersive experience. In addition, the security area can prevent other non-experiencers from straying into the experience area and avoid that they are injured due to the actions of the experiencer. However, the range of the security area is usually fixed, which may limit the range of activities of the user, thereby affecting the immersive experience of the user.

SUMMARY

Embodiments of the present application provide a security prompt method and apparatus, a storage medium, a device, and a program product, which can achieve dynamic adaptation of a security area, the user is not limited in the range of activities, security is improved, and the immersive experience of the user is enhanced.

In an aspect, an embodiment of the present application provides a security prompt method, and the method includes:

acquiring environmental data of a physical environment;

obtaining pose data of a user;

classifying entities in the physical environment into danger levels based on the environmental data and the pose data;

presenting a visual indication for security warning when a distance between a collider and a target entity belonging to a target danger level reaches a danger distance threshold, wherein the collider is constructed based on an interactor corresponding to the user.

In another aspect, an embodiment of the present application provides a security prompt apparatus, and the apparatus includes:

an acquisition unit, configured to acquire environmental data of a physical environment;

an obtaining unit, configured to obtain pose data of a user;

a classification unit, configured to classify entities in the physical environment into danger levels based on the environmental data and the pose data;

a presentation unit, configured to present a visual indication for security warning when a distance between a collider and a target entity belonging to a target danger level reaches a danger distance threshold, wherein the collider is constructed based on an interactor corresponding to the user.

In another aspect, an embodiment of the present application provides a computer-readable storage medium, and the computer-readable storage medium stores a computer program, which is suitable for a processor to load to perform the security prompt method according to any one of the above embodiments.

In another aspect, an embodiment of the present application provides a terminal device, and the terminal device includes a processor and a memory. The memory stores a computer program, and the processor is configured to perform the security prompt method according to any one of the above embodiments by invoking the computer program stored in the memory.

In an aspect, an embodiment of the present application provides a computer program product, including a computer program, and the computer program, when executed by a processor, implements the security prompt method according to any one of the above embodiments.

According to the embodiments of the present application, the environmental data of the physical environment is acquired; the pose data of the user is obtained; the entities in the physical environment are classified into danger levels based on the environmental data and the pose data; and the visual indication for security warning is presented when the distance between the collider and the target entity belonging to the target danger level reaches the danger distance threshold, where the collider is constructed based on the interactor corresponding to the user. According to the embodiments of the present application, the danger levels of the entities in the physical environment can be dynamically classified based on the environmental data and the pose data of the user. In addition, the visual indication for security warning is presented when the distance between the collider and the target entity belonging to the target danger level reaches the danger distance threshold.

BRIEF DESCRIPTION OF THE DRAWINGS

In order to describe the technical solutions in the embodiments of the present application more clearly, the following briefly describes the accompanying drawings required for describing the embodiments. Apparently, the accompanying drawings in the following description show merely some embodiments of the present application, and a person of ordinary skill in the art may still derive other drawings from these accompanying drawings without creative efforts.

FIG. 5 is a schematic diagram of a fourth application scenario of the security prompt method according to an embodiment of the present application.

DETAILED DESCRIPTION OF EMBODIMENTS

Figure 1:
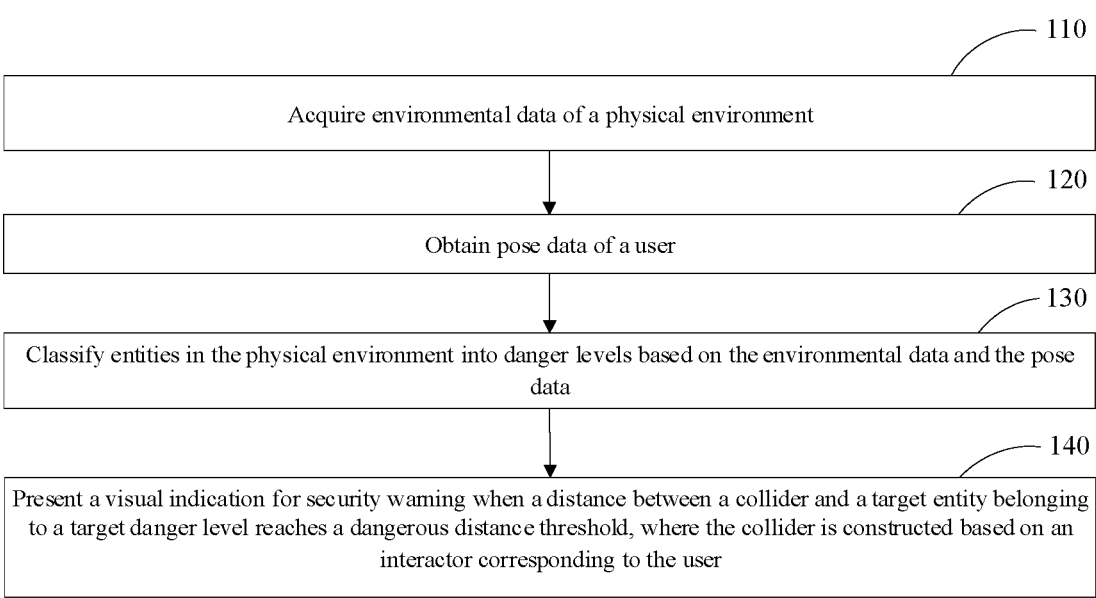
FIG. 1 is a schematic flowchart of a security prompt method according to an embodiment of the present application.

The following clearly and completely describes the technical solutions in the embodiments of the present application with reference to the accompanying drawings in the embodiments of the present application. Apparently, the described embodiments are merely some rather than all of the embodiments of the present application. All other embodiments obtained by a person of ordinary skill in the art based on the embodiments of the present application without creative efforts shall fall within the protection scope of the present application.

The embodiments of the present application may be applied to various application scenarios such as extended reality (XR), virtual reality (VR), augmented reality (AR), mixed reality (MR), and the like.

First, some nouns or terms that appear in the process of describing the embodiments are explained as follows:

A virtual scene is a virtual scene displayed (or provided) when an application is run on a terminal or a server. Optionally, the virtual scene is a simulation environment of the real world, or a semi-simulation and semi-fictional virtual environment, or a purely fictional virtual environment. The virtual scene is any one of a two-dimensional virtual scene and a three-dimensional virtual scene. The virtual environment may be sky, land, ocean, and the like, where the land includes environmental elements such as a desert, a city, or the like. The virtual scene is a scene in which a user controls a virtual object or the like to complete game logic.

A virtual object refers to a dynamic object that can be controlled in a virtual scene. Optionally, the dynamic object may be a virtual person, a virtual animal, a cartoon character, or the like. The virtual object is a character controlled by a player through an input device, or an artificial intelligence (AI) set in a virtual environment battle through training, or a non-player character (NPC) set in a virtual scene battle. Optionally, the virtual object is a virtual person who participates in a competition in the virtual scene. Optionally, the number of virtual objects in the virtual scene battle is preset or dynamically determined based on the number of clients that join the battle, which is not limited in the embodiments of the present application. In a possible implementation, a user can control a virtual object to move in the virtual scene, for example, control the virtual object to run, jump, crawl, and the like, or can control the virtual object to battle with another virtual object by using a skill, a virtual prop, and the like provided by an application. Optionally, the virtual object may also refer to a static object that can be interacted with in the virtual scene, such as a virtual article, a virtual control, an interface element, a virtual prop, and the like.

Extended reality (XR) is a concept including virtual reality (VR), augmented reality (AR), and mixed reality (MR), and refers to a technology of connecting a virtual world to a real world to create an environment in which a user can interact with the environment in real time.

Virtual reality (VR) is a technology of creating and experiencing a virtual world. A virtual environment is generated through computing, which is a multi-source information (virtual reality mentioned herein includes at least visual perception, and may further include auditory perception, tactile perception, motion perception, or even gustatory perception, olfactory perception, etc.). The virtual environment is fused and an interactive three-dimensional dynamic view and entity behavior simulation are implemented, so that a user is immersed in a simulated three-dimensional environment, and various applications of virtual environments such as mapping, gaming, video, education, medical treatment, simulation, collaborative training, sales, assisted manufacturing, maintenance, and repair are implemented.

Augmented reality (AR) is a technology of adding a virtual element to an image collected by a camera based on a camera pose parameter of the camera in the real world (or the three-dimensional world or the real world) that is calculated in real time during image collection by the camera. The virtual element includes but is not limited to an image, a video, and a three-dimensional model. The AR technology aims to superimpose the virtual world on the real world on a screen for interaction.

Mixed reality (MR) is a simulated setting that integrates computer-created sensory input (for example, a virtual object) with sensory input from a physical setting or a representation thereof. In some MR settings, the computer-created sensory input can be adapted to changes in the sensory input from the physical setting. In addition, some electronic systems for presenting MR settings can monitor an orientation and/or position relative to the physical setting, so that the virtual object can interact with the real object (that is, a physical element from the physical setting or a representation thereof). For example, the system can monitor motion, so that the virtual plant appears to be stationary relative to the physical building.

Augmented virtuality (AV): An AV setting refers to a simulated setting in which a computer-created setting or a virtual setting incorporates at least one sensory input from a physical setting. One or more sensory inputs from the physical setting may be a representation of at least one feature of the physical setting. For example, a virtual object can present a color of a physical element captured by one or more imaging sensors. In another example, the virtual object can present a feature consistent with an actual weather condition in the physical setting, such as identified by a weather-related imaging sensor and/or online weather data. In another example, an augmented reality forest can have virtual trees and structures, but the animals can have features that are accurately reproduced from images taken of physical animals.

A virtual field of view is an area in a virtual environment that a user can perceive through a lens in a virtual reality device, and a field of view (FOV) of the virtual field of view is used to represent the perceived area.

A virtual reality device is a terminal that implements a virtual reality effect, and is usually provided in the form of glasses, a head mount display (HMD), or contact lenses, to implement visual perception and other forms of perception. Certainly, the form implemented by the virtual reality device is not limited thereto, and can be further miniaturized or enlarged as required.

The virtual reality device described in the embodiments of the present application may include but is not limited to the following types:

A PC virtual reality (PCVR) device, which uses a PC to perform related calculation and data output of a virtual reality function, and an external PC virtual reality device uses data output by the PC to implement a virtual reality effect.

A mobile virtual reality device, which supports a mobile terminal (such as a smart phone) to be set in various ways (such as a head-mounted display provided with a dedicated card slot), and is connected to the mobile terminal through a wired or wireless connection, wherein related calculation of the virtual reality function is performed by the mobile terminal, and data is output to the mobile virtual reality device, for example, a virtual reality video is watched through an APP of the mobile terminal.

An all-in-one virtual reality device, which is provided with a processor for related calculation of a virtual function, and therefore has an independent virtual reality input and output function, does not need to be connected to a PC or a mobile terminal, and has a high degree of freedom of use.

The following are described in detail. It should be noted that the description order of the following embodiments is not used as a limitation on the priority of the embodiments.

Each of the embodiments of the present application provides a security prompt method. The method may be performed by a terminal or a server, or may be performed jointly by the terminal and the server. The embodiments of the present application are described by taking an example in which the security prompt method is performed by a terminal device.

Please refer to FIG. 1 to FIG. 9. FIG. 1 is a schematic flowchart of a security prompt method according to an embodiment of the present application, and FIG. 2 to FIG. 9 are all schematic diagrams of application scenarios of the security prompt method according to an embodiment of the present application. The method can be applied to a terminal device, and the terminal device may include any one of an extended reality device, a virtual reality device, an augmented reality device, and a mixed reality device. The method includes the following steps 110 to 140:

Step 110: acquire environmental data of a physical environment.

For example, the physical environment may be a three-dimensional physical space, which means that the environmental data is acquired in the three-dimensional physical space.

The environmental data may include light intensity in the physical environment, position information and attribute information of an entity in the physical environment, and the like. The attribute information of the entity may include information of at least one of a shape, a material, a sharp degree, a moving speed, a moving direction, and the like, of the entity.

The environmental data is crucial for subsequent danger level classification, and can help the system understand the state of the environment.

Figure 6:
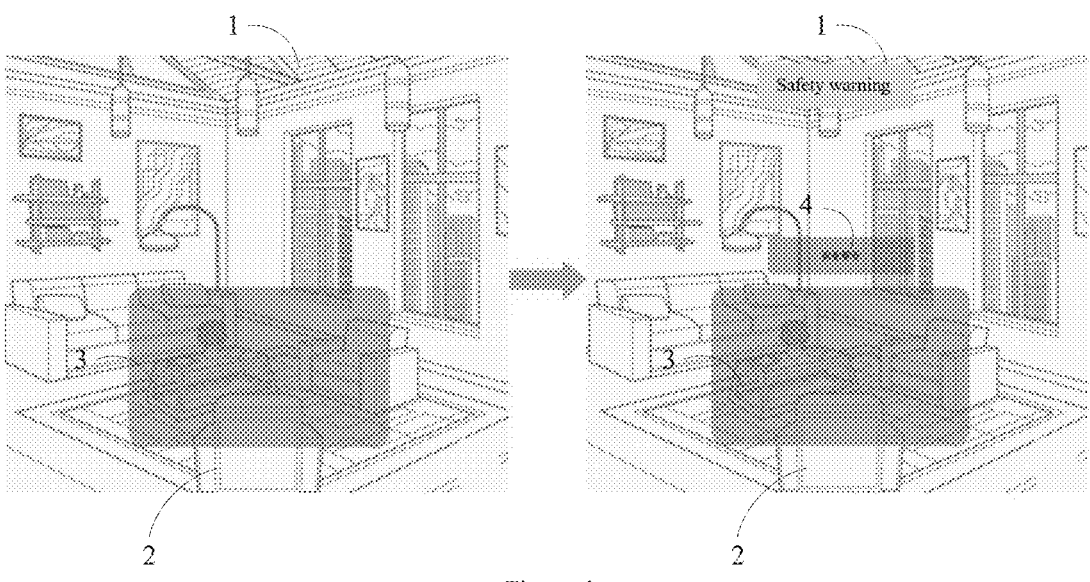
FIG. 6 is a schematic diagram of a fifth application scenario of the security prompt method according to an embodiment of the present application.

Taking an indoor scene as an example, as shown in FIG. 6, the physical environment may include a space such as a living room, or the like. The entities in the physical environment may include various real objects such as the ground, walls, a sofa, a door and window, a coffee table, a shelf, a table lamp, a potted plant, and the like in any space.

For example, the entities in the embodiment of the present application may include two types: an obstacle entity and a ground entity. The obstacle entity is an entity that may collide with the user and affect the normal movement of the user, such as a wall, a sofa, a door and window, a coffee table, a shelf, a table lamp, a potted plant, and the like.

When the environmental data is acquired in the three-dimensional physical space, various sensors and devices such as a laser radar, a depth camera, and a camera are usually required. These devices can measure various physical quantities in the three-dimensional physical space, such as distance, angle, speed, position, shape, and the like, to obtain detailed information about the environment.

For example, the laser radar can measure a distance and an angle between objects to help the system understand the position and the shape of the objects. The depth camera can acquire a three-dimensional image of an object to help the system recognize attribute information such as a shape, a material, and a sharp degree, or the like, of the object. The camera can acquire attribute information such as a color, a texture, or the like, of an object to help the system recognize an attribute and a state of the object.

Step 120: Obtain pose data of a user.

For example, multi-modalities may be used to obtain the pose data of the user. The pose data may include a position, a posture, a moving speed, a moving direction, and the like of a body (such as a hand, a head, a foot, a waist, and the whole body) of the user.

The multi-modalities may refer to acquiring the pose data through a plurality of sensors and devices, acquiring the pose data, and the like, through a plurality of technical means to obtain more comprehensive and accurate information.

For example, when the pose data of the user is obtained, a plurality of sensors and devices, such as a camera, an accelerometer, and a gyroscope, may be used.

For example, the camera can capture an action and a posture of the user. Through a computer vision technology, body parts and actions of the user can be recognized, to obtain the pose data of the user. For example, a demand and an intention of the user may be determined by recognizing a head posture and a gesture of the user.

For example, the accelerometer and the gyroscope can measure a motion state and a posture change of the user. By analyzing these data, the pose data such as a walking posture, a body inclination, a gesture, or the like, of the user can be obtained. These data can help the system better understand an intention and an action of the user, thereby providing a more accurate response and a personalized interaction.

For example, through hand pose recognition, hand actions and gestures of the user can be recognized, so as to determine the demand and the intention of the user. Through head pose recognition, head actions and a sight direction of the user can be recognized, so as to determine a focus and an intention of the user. Through foot pose recognition, a walking posture and gait characteristics of the user can be recognized, so as to determine an emotion and a health condition of the user. Through whole body pose recognition, a range of activities of the user can be determined.

For example, when the pose data of the user is obtained, a plurality of technical means such as voice recognition, gesture recognition, environment recognition based on environmental factors, and touch recognition of a user body touching a surrounding object, or the like can be used. These technical means can help the system better understand the intention and the demand of the user, thereby providing a more intelligent and personalized interactive experience.

For example, the multi-modal method may further include voice recognition. For example, through a voice recognition technology, voice instructions and speaking content of the user can be recognized. For example, the user issues a voice instruction "go forward", and the system converts the voice of the user into text through the voice recognition technology, and recognizes that the intention of the user is to go forward. By analyzing the voice instructions and the speaking content of the user, the pose data of the user such as the head posture, the gesture, or the like can be further obtained.

For example, the multi-modal method may further include gesture recognition. For example, hand actions and gestures of the user can be recognized through a gesture recognition technology. For example, the user controls a virtual object in a virtual scene through a gesture. Through the gesture recognition technology, the hand actions and the gestures of the user can be recognized, and the pose data of the user such as a hand posture can be further obtained, so as to determine the intention and the demand of the user.

In addition, the multi-modal method may further include environment recognition based on environmental factors. For example, by recognizing environmental factors such as light, temperature, humidity, and the like in a physical environment where the user is located, the state and the demand of the user can be further understood. For example, if the light is too dark or too bright, the user may move at a lower speed during the movement. If the temperature is too high, the user may reduce an amplitude of motion to cool down. If the temperature is too low, the user may increase the amplitude of motion to warm up. Therefore, an impact based on the environmental factors may cause the pose data of the user to change.

In addition, the multi-modal method may further include touch recognition of the user body touching a surrounding object. For example, an intention and a demand of the user can be determined by recognizing an object touched by the user and a touch manner. For example, it is recognized that the user touches a surrounding object during an interaction, and the user may change the posture to avoid touching. Therefore, the touch recognition may cause the pose data of the user to change.

In conclusion, obtaining the pose data of the user through the multi-modal method is an important means for implementing accurate response and personalized interaction. Through a combination of a plurality of sensors and devices and a plurality of technical means, more comprehensive and accurate pose data can be obtained.

Step 130: Classify the entities in the physical environment into danger levels based on the environmental data and the pose data.

The system can classify the entities in the physical environment into the danger levels by combining the environmental data and the pose data, to determine which entities pose a potential danger to the user.

In some embodiments, the classifying the entities in the physical environment into danger levels based on the environmental data and the pose data comprises:

determining a target size of the collider based on the environmental data and the pose data;

classifying the entities in the physical environment into danger levels based on the environmental data and the target size.

The collider is constructed based on an interactor corresponding to the user. For example, the interactor may be a hand, a head, a foot, a waist, or the whole body of the user, or another type of interactor, such as a handle, a controller, a stylus, or the like. The collider is used to represent an interaction area or an interaction range of the interactor.

For example, by analyzing the environmental data and the pose data, the system can determine the target size of the collider, that is, an interaction area or an interaction range that the user may touch during extended reality interaction, and the target size may also represent the security area. The target size may be determined based on factors such as positions, sizes, shapes, and attributes of the entities in the environmental data and the pose data of the user, to ensure the safety of the user.

Then, the entities in the physical environment can be classified into danger levels based on the environmental data and the target size. In this process, the factors such as the positions, the sizes, the shapes, and the attributes of the entities need to be compared with the target size, to determine whether the entities pose a danger to the user. For example, if a position, a size, or a shape of an entity matches the target size, the entity may pose a danger to the user, and therefore the entity needs to be classified into a high-risk level. According to different danger levels, the system can take corresponding security measures, for example, warning the user, limiting a range of actions of the user, and the like.

Since the environmental data and the pose data may change, in the embodiments of the present application, the target size of the collider can be dynamically adapted based on the environmental data and the pose data of the user that change in real time, and the entities in the physical environment are dynamically classified into danger levels based on the environmental data and the dynamically adapted target size. This means that the system can dynamically adjust the target size of the collider based on changes in the behavior of the user and the environment, and adjust the danger levels of the entities accordingly. In this way, the dynamic adaptation of the security area can be achieved, and the range of activities of the user is not limited while ensuring the safety of the user.

In some embodiments, the determining a target size of the collider based on the environmental data and the pose data comprises:

performing scene segmentation based on preset pose data to determine a preset segmented scene, wherein the preset segmented scene at least comprises a fixed scene, a fine motion scene, and a moving scene;

determining a target scene based on the environmental data and the pose data, wherein the target scene is one of the preset segmented scenes; and determining the target size of the collider based on the target scene.

First, scene segmentation is performed based on the preset pose data to determine the preset segmented scene. For example, when the user wears a virtual reality device to perform extended reality interaction with a virtual scene, the preset segmented scene at least includes a fixed scene, a fine motion scene, and a moving scene.

The fixed scene: in the fixed scene, the user completes the interaction in place, without obvious action or movement. For example, when the user observes or interacts based on the virtual scene, the user may just stand in place and interact with a virtual object by using an interactor such as a hand, a head, or a handle. In this case, the target size of the collider can be accurately determined based on the environmental data and the pose data of the user. For example, if the head of the user is in a fixed state, the target size of a head collider may be determined based on factors such as a position, a size, and a shape of the head.

The fine motion scene: in the fine motion scene, the user may need to interact with the virtual object by moving in a small range. For example, when a virtual object controlled by the user walks or performs a fine action in the virtual scene, the user may need to make a small movement by using an interactor such as a hand, a head, or a handle. In this case, the target size of the collider can be determined based on the environmental data and the fine motion pose data of the user. For example, if the hand of the user makes a small movement in the physical environment, the target size of the collider corresponding to the hand may be determined based on factors such as a position, a moving speed, and a moving direction of the hand.

The moving scene: in the moving scene, the user may need to make a large movement or perform an exercise to complete the interaction. For example, when the virtual object controlled by the user runs, jumps, or performs other vigorous exercises in the virtual scene, the user may need to make a movement in a large range by using an interactor such as a hand, a head, or a foot. In this case, the target size of the collider can be determined based on the environmental data and the moving pose data of the user. For example, if the foot of the user makes a movement in a large range in the physical environment, the target size of the collider corresponding to the foot may be determined based on factors such as a position, a moving speed, and a moving direction of the foot.

According to a result of the scene segmentation, the system may further determine the target scene based on the environmental data and the pose data of the user. The target scene may be one of the preset segmented scenes. For example, if the user is performing fine motion interaction, the target scene may be the fine motion scene. Then, the system can determine the target size of the collider based on the target scene.

In conclusion, when the user wears the virtual reality device to perform extended reality interaction with the virtual scene, the system can more accurately determine the target size of the collider by performing scene segmentation based on the preset pose data and determining the target scene based on the environmental data and the pose data. This helps improve the security of the system and the accuracy of the interactive experience. In addition, this scene segmentation method can also be applied to other types of interactive devices or interactive methods, to provide a more intelligent and secure interactive experience.

In some embodiments, the determining the target size of the collider based on the target scene comprises:

if the target scene is the fixed scene, determining the target size of the collider as a first size;
  if the target scene is the fine motion scene, determining the target size of the collider as a second size;
  if the target scene is the moving scene, determining the target size of the collider as a third size,
  wherein the first size is smaller than the second size, and the second size is smaller than the third size.

The target size of the collider varies according to different target scenes.

For example, the size of the collider changes according to the determined target scene. For example, when the user rotates or swings the body, the user is determined to be in the fine motion scene, and the collider is larger than that in a default situation. When the user uses the system to operate statically, the user is determined to be in the fixed scene, and the collider is reduced accordingly.

Figure 2:
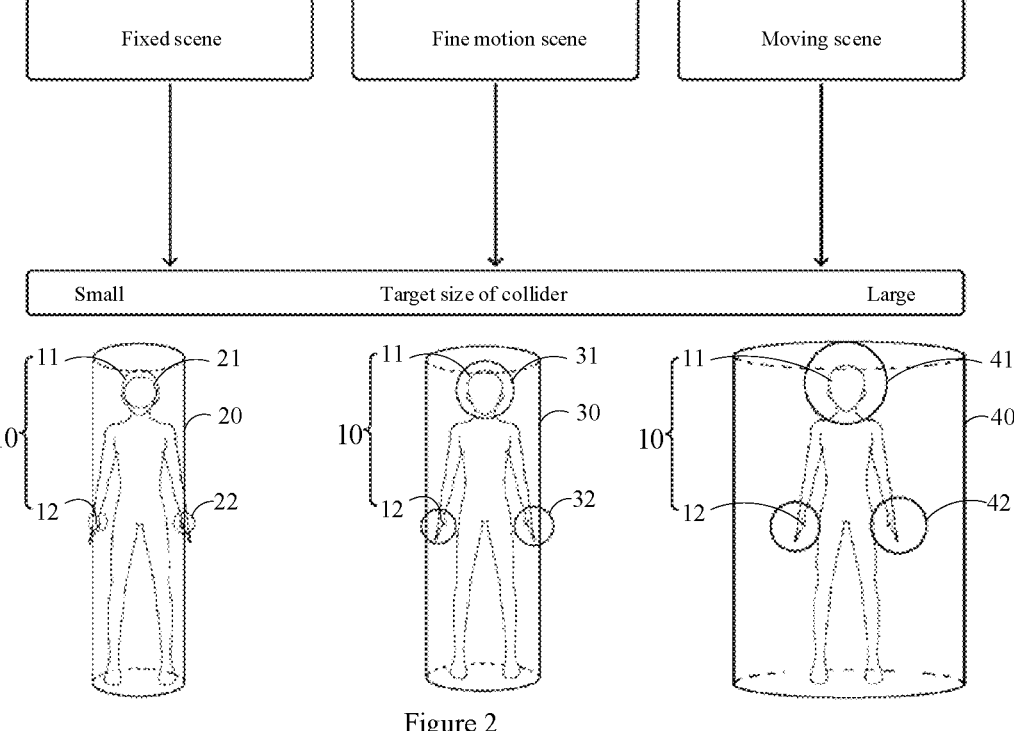
FIG. 2 is a schematic diagram of a first application scenario of the security prompt method according to an embodiment of the present application.

As shown in FIG. 2, if the target scene is the fixed scene, the target size of the collider 20 is determined as the first size. In the fixed scene, the user is in a fixed state, without obvious action or movement. Therefore, the target size of the collider 20 is usually small to avoid unnecessary collisions with the entities in the static environment. The first size is usually a small size calculated based on the environmental data and the pose data of the user.

As shown in FIG. 2, if the target scene is the fine motion scene, the target size of the collider 30 is determined as the second size. In the fine motion scene, the user needs to complete the interaction by moving in a small range. In this case, the target size of the collider 30 is slightly larger to adapt to the small-range movement of the user. The second size is usually a slightly larger size calculated based on the environmental data and the fine motion pose data of the user.

As shown in FIG. 2, if the target scene is the moving scene, the target size of the collider 40 is determined as the third size. In the moving scene, the user needs to make a large movement or perform an exercise to complete the interaction. In this case, the target size of the collider 40 is larger to adapt to the movement and the exercise of the user. The third size is usually a large size calculated based on the environmental data and the moving pose data of the user.

The first size is smaller than the second size, and the second size is smaller than the third size. This means that as the target scene changes from the static scene to the fine motion scene and then to the moving scene, the target size of the collider also increases accordingly. This design considers the interactive requirements and the security of the user in different scenes. In the fixed scene, because the user is in the fixed state, a small target size of the collider can avoid unnecessary collisions; in the fine motion scene, a slightly larger target size can adapt to the small-range movement of the user; and in the moving scene, a larger target size can adapt to the movement and the exercise of the user.

In conclusion, determining the target size of the collider based on the target scene is a key step to implement intelligent and secure interaction. By determining different target sizes of the collider according to different target scenes, the interactive requirements of the user can be better met and the security of the system can be improved.

In some embodiments, the interactor comprises at least one sub-interactor, and the determining the target size of the collider based on the target scene comprises:

constructing a sub-collider corresponding to each of the sub-interactors in the at least one interactor based on the at least one sub-interactor corresponding to the user, where all the sub-colliders constitute the collider; and
  determining a sub-target size of each of the sub-colliders based on the target scene, and determining the target size of the collider based on the sub-target sizes of all the sub-colliders.

For example, the interactor may include at least one sub-interactor, such as a hand, a head, a foot, a waist, or the whole body of the user, or another type of interactor, such as a handle, a controller, or a stylus. These sub-interactors can interact with the virtual scene separately or in combination.

When the target size of the collider is determined based on the target scene, the system may construct the sub-collider corresponding to each of the sub-interactors based on the at least one sub-interactor corresponding to the user. All the sub-colliders together constitute the collider.

As shown in FIG. 2, if the user uses the head 11 and the hand 12 (both hands) to interact with the virtual scene, the system may respectively construct the sub-collider 21 (31 or 41) corresponding to the head 11 and the sub-collider 22 (32 or 42) corresponding to the hand 12 based on the pose data of the head 11 and the hand 12, and all the sub-colliders together constitute the collider 20 (30 or 40).

When the sub-target size of each of the sub-colliders is determined based on the target scene, the system may determine the sub-target size of each of the sub-colliders based on the environmental data and the pose data of the user. For example, if the head posture of the user is in a static state, the sub-target size of the sub-collider corresponding to the head may be determined based on factors such as a position, a size, and a shape of the head.

After the sub-target sizes of all the sub-colliders are determined, the system may determine the target size of the collider based on these sub-target sizes. For example, if the sub-target sizes of the hand and the head are X1 and X2 respectively, and X1 is less than X2, the target size of the collider may be determined as a union of X1 and X2 to ensure the safe interaction of the hand and the head.

In some embodiments, the method further comprises:
determining a second size relationship among the sub-target sizes of the sub-colliders based on a first size relationship among the sub-interactors in the same target scene, where the first size relationship is consistent with the second size relationship.

For example, the second size relationship among the sub-target sizes of the sub-colliders may be determined based on the first size relationship among the sub-interactors in the same target scene. The first size relationship is consistent with the second size relationship to ensure the accuracy of interaction in the virtual scene. For example, if a first size of the hand is greater than a first size of the head, the sub-target size of the hand should be greater than the sub-target size of the head to avoid collisions or interference in the virtual scene.

In conclusion, by constructing the sub-collider corresponding to each of the sub-interactors based on the at least one sub-interactor corresponding to the user and determining the sub-target size of each of the sub-colliders based on the target scene, the target size of the collider can be determined more accurately. This helps improve the security of the system and the accuracy of the interactive experience. In addition, by considering the size relationship among the sub-interactors, the interactive effect in the virtual scene can be further optimized.

In some embodiments, the classifying the entities in the physical environment into danger levels based on the environmental data and the target size comprises:
determining attribute information of the entities in the physical environment based on the environmental data, where the entities include an obstacle entity and a ground entity; and
classifying the entities in the physical environment into danger levels based on the target size and the attribute information of the entities, where the danger levels at least include a high-risk level, a medium-risk level, and a low-risk level.

The classifying the entities in the physical environment into danger levels based on the environmental data and the target size can help the system better understand the entities in the physical environment and evaluate a potential danger of the entities to the user based on the attributes of the entities and the target size.

First, the attribute information of the entities in the physical environment is determined based on the environmental data. The attribute information may include a shape, a size, a position, a speed, a sharp degree, and the like of the entity. For example, the obstacle entity may include a static object such as a wall, a table, or a chair, and the ground entity may include a ground, a step, a slope, and the like.

Then, the entities in the physical environment are classified into danger levels based on the target size and the attribute information of the entities. The danger levels at least include a high-risk level, a medium-risk level, and a low-risk level. An entity of the high-risk level may pose a direct threat to the user, such as a tall obstacle entity or a fast-moving entity. An entity of the medium-risk level may pose a certain threat to the user but will not immediately cause harm. An entity of the low-risk level poses a small threat to the user and usually will not cause direct harm.

Such danger level classification can help the system better understand and evaluate the potential danger of the entities in the physical environment to the user. For example, when the user approaches a tall and big obstacle entity, the system may remind the user to pay attention to avoid or take other security measures. When the user approaches a fast-moving entity, the system may remind the user to keep a distance or take emergency avoidance measures.

In addition, such danger level classification can further help the system adopt different interactive strategies according to different danger levels. For example, for an entity of the high-risk level, the system may take more stringent security measures, such as automatic avoidance or emergency stop. For an entity of the medium-risk level, the system may adopt a more conservative interactive strategy, such as reminding the user to observe or approach slowly. For an entity of the low-risk level, the system may adopt a more lenient interactive strategy, such as allowing the user to interact freely or explore.

The classifying the entities in the physical environment into danger levels based on the environmental data and the target size can help the system better understand the entities in the physical environment and evaluate the potential danger of the entities to the user based on the attributes of the entities and the target size. The danger level classification can help the system adopt a more intelligent and secure interactive strategy, and improve the interactive experience and security of the user.

In some embodiments, the classifying the entities in the physical environment into danger levels based on the target size and the attribute information of the entities comprises:
determining a danger level of a first obstacle entity based on the target size and a sharp degree in attribute information of the obstacle entity; and
determining a danger level of the ground entity based on the target size and an entity size in attribute information of a second obstacle entity located on the ground entity.

First, the danger level of the first obstacle entity can be determined based on the target size and the sharp degree in the attribute information of the obstacle entity. The sharp degree can be used as an important indicator for evaluating the danger of the entity. For example, a sharp obstacle entity may pose a greater threat to the user because it may be more likely to cause harm. Therefore, the sharp degree of the entity in the physical environment is classified, and then the danger level classification is further performed based on the target size and the sharp degree of the obstacle entity.

Figure 3:
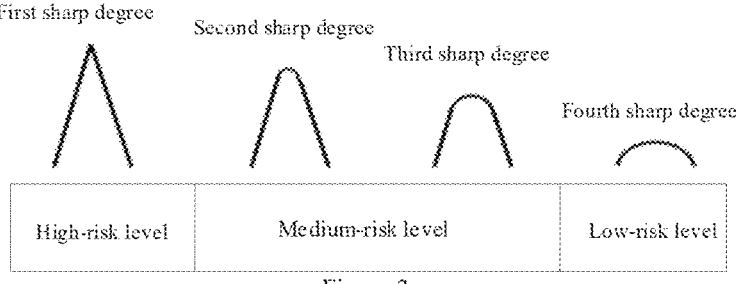
FIG. 3 is a schematic diagram of a second application scenario of the security prompt method according to an embodiment of the present application.
Figure 4:
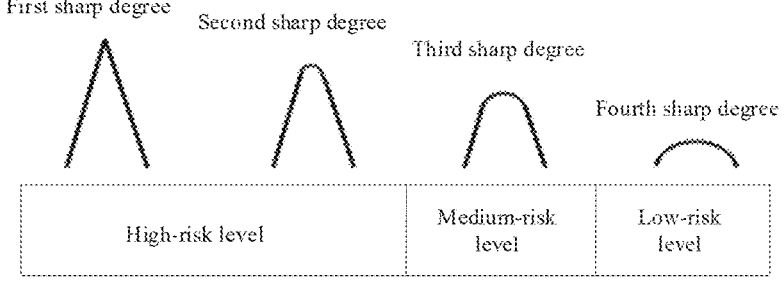
FIG. 4 is a schematic diagram of a third application scenario of the security prompt method according to an embodiment of the present application.

As shown in FIG. 3 to FIG. 5, the sharp degree is classified into a first sharp degree, a second sharp degree, a third sharp degree, and a fourth sharp degree, which are arranged in a descending order from the first sharp degree to the fourth sharp degree. The target size of the collider may be determined according to different target scenes, and the danger level is determined based on the target size and the sharp degree of the obstacle entity.

As shown in FIG. 3, if the target scene is the fixed scene, then the target size of the collider is the first size, the first sharp degree of the obstacle entity corresponds to the high-risk level, the second sharp degree and the third sharp degree of the obstacle entity correspond to the medium-risk level, and the fourth sharp degree of the obstacle entity corresponds to the low-risk level.

As shown in FIG. 4, if the target scene is the fine motion scene, the target size of the collider is determined as the second size, the first sharp degree of the obstacle entity corresponds to the high-risk level, the second sharp degree of the obstacle entity corresponds to the medium-risk level, and the third sharp degree and the fourth sharp degree of the obstacle entity correspond to the low-risk level.

As shown in FIG. 5, if the target scene is the moving scene, the target size of the collider is determined as the third size, the first sharp degree and the second sharp degree of the obstacle entity correspond to the high-risk level, the third sharp degree of the obstacle entity corresponds to the medium-risk level, and the fourth sharp degree of the obstacle entity corresponds to the low-risk level.

Then, the danger level of the ground entity is determined based on the target size and an entity size in attribute information of a second obstacle entity located on the ground entity. For example, the second obstacle entity may include an electric wire, a step, a pit, a slope, and the like. The danger level classification process of the ground entity is dynamically fitted, and the danger level is determined based on the target size of the collider. For example, the danger level is determined based on the entity size of the second obstacle entity and a sub-target size of a sub-collider corresponding to a foot of the user (sub-interactor). For example, if the entity size of the second obstacle entity is less than the sub-target size of the foot of the user, the second obstacle entity located on the ground entity does not pose a great threat to the user, so that the ground entity does not involve a dangerous situation such as tripping, and therefore the system can determine the danger level of the ground entity as the low-risk level.

Step 140: Present a visual indication for security warning when a distance between the collider and a target entity belonging to a target danger level reaches a dangerous distance threshold, where the collider is constructed based on an interactor corresponding to the user.

This step can remind the user to pay attention to a dangerous situation and take corresponding security measures.

The collider is constructed based on the interactor corresponding to the user. For example, the collider is determined based on an action and an interactive manner of the user, for example, a moving speed, a moving direction, and a position of the user. By constructing the collider, an interaction range between the user and the entity in the physical environment can be simulated, so that the danger level and the distance of the entity can be evaluated.

For example, the high-risk level may be determined as the target danger level. Alternatively, the high-risk level and the medium-risk level may be determined as the target danger level. An entity having danger level belongs to the target danger level in the entities in the physical environment is determined as the target entity.

In addition, the dangerous distance threshold is an important parameter for determining when to present the visual indication for security warning. The dangerous distance threshold can be adjusted according to different scenes and user requirements. For example, in some cases, when the distance between the collider and the target entity is less than or equal to the dangerous distance threshold, the visual indication for security warning can be presented. The dangerous distance threshold can be set based on an actual situation to ensure that the user can take security measures in time. For example, if the target scene is the fixed scene, the dangerous distance threshold may be set to 20 cm; if the target scene is the fine motion scene, the dangerous distance threshold may be set to 50 cm; or if the target scene is the moving scene, the dangerous distance threshold may be set to 100 cm.

When presenting the visual indication for security warning, various forms such as a warning icon, a flashing light, a text prompt, a sound prompt, and widening of a field of view of the user may be used. These visual indications can attract the attention of the user and remind the user to pay attention to the danger in the surrounding environment.

The form of the visual indication may be various, and may be customized according to different target danger levels and attribute information of the target entity. For example, for a target entity of the high-risk level, the visual indication may be a flashing red warning light or an urgent alarm sound, to attract the attention of the user and prompt the user to take action quickly. For a target entity of the medium-risk level, the visual indication may be a yellow warning light or a slower alarm sound, to remind the user to pay attention and take appropriate action.

In addition, the visual indication may also be combined with an interactive behavior of the user to provide a more accurate danger warning. For example, if the user is approaching a target entity of the high-risk level, the system may display an arrow or a path in the visual indication, to guide the user to stay away from a dangerous area.

In some embodiments, the presenting a visual indication for security warning comprises:

displaying, in the physical environment, a virtual scene generated by a virtual reality device, where the virtual scene includes at least one virtual object;

displaying security warning prompt information in the virtual scene.

The system presents a virtual scene and displays the security warning prompt information in the virtual scene to perform security warning, and the security warning prompt information is a type of the visual indication.

First, the system displays, in the physical environment, the virtual scene generated by the virtual reality device. The virtual scene may be a virtual environment similar to the real world, or may be a virtual world completely generated by a computer. The virtual scene may include various virtual objects, such as characters, objects, buildings, and the like.

Then, when a distance between the collider and a target entity of the target danger level reaches the dangerous distance threshold, the system displays the security warning prompt information in the virtual scene. The information may be text, an image, a sound, or another form of visual element. For example, if the user is approaching a target entity of the high-risk level, the system may display a red warning sign, a flashing alarm light, a warning bar, a label, or a notification in the virtual scene, to remind the user to pay attention and take action.

As shown in FIG. 6, the system displays, in the physical environment 1, the virtual scene generated by the virtual reality device, the virtual scene includes at least one virtual object 3, and when a distance between the collider and a target entity 2 (sofa) of the target danger level reaches the dangerous distance threshold (as shown in a left diagram of FIG. 6), the security warning prompt information 4 is displayed in the virtual scene (as shown in a right diagram of FIG. 6).

For example, the security warning prompt information 4 may also be combined with the virtual object 3 in the virtual scene to provide a more intuitive and vivid warning effect. For example, if the user is approaching a target entity 2 (sofa) of the high-risk level, the system may display, in the virtual scene, a sofa virtual object related to the target entity 2 (sofa), and display the security warning prompt information 4 on the sofa virtual object.

In conclusion, the security warning prompt information is displayed in the virtual scene, so that the user can better understand the potential danger and take an appropriate action to avoid or reduce the potential harm. Such virtual reality technology can provide a more immersive and interactive experience, and make the security warning more vivid and effective.

In some embodiments, the presenting a visual indication for security warning further comprises:

when the target entity is blocked by a first virtual object, adjusting at least a part of the first virtual object to a see-through state, to reveal the target entity.

To ensure that the user can clearly see the target entity and understand the potential danger, the system takes additional measures to adjust a display state of the virtual object.

When the target entity is blocked by the first virtual object, the system adjusts at least a part of the first virtual object to the see-through state. This means that the part or all of the first virtual object become transparent or semi-transparent, so that the user can see the target entity through the first virtual object.

Figure 7:
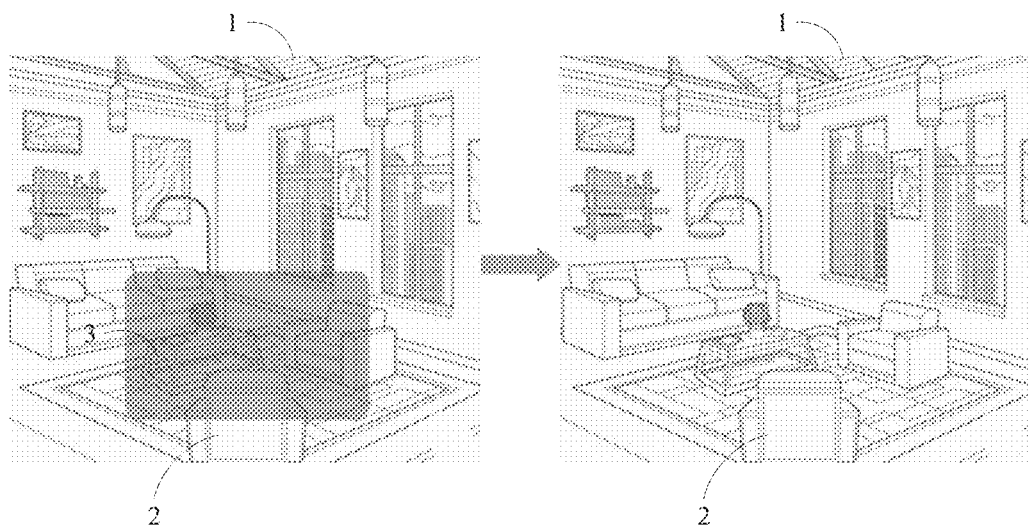
FIG. 7 is a schematic diagram of a sixth application scenario of the security prompt method according to an embodiment of the present application.

As shown in FIG. 7, when the target entity 2 is blocked by the first virtual object 3 (as shown in a left diagram of FIG. 7), the system adjusts the entire first virtual object 3 to the see-through state, so that the user can see the target entity 2 through the first virtual object (as shown in a right diagram of FIG. 7).

Figure 8:
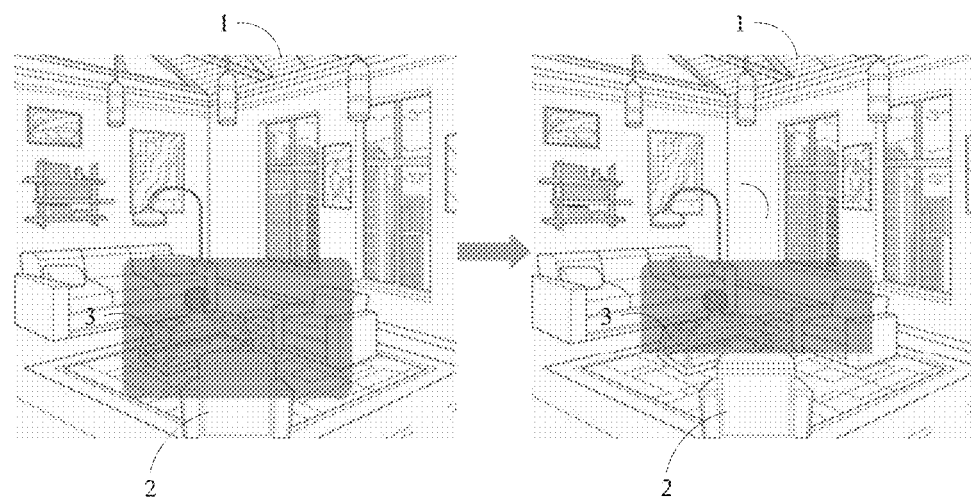
FIG. 8 is a schematic diagram of a seventh application scenario of the security prompt method according to an embodiment of the present application.

As shown in FIG. 8, when the target entity 2 is blocked by the first virtual object 3 (as shown in a left diagram of FIG. 8), the system adjusts a part of the first virtual object 3 to the see-through state, so that the user can see the target entity 2 through the first virtual object (as shown in a right diagram of FIG. 8).

Such adjustment can ensure that the user can clearly see a position, a shape, and a size of the target entity, thereby better understanding the potential danger. In addition, such adjustment can also provide a more intuitive and vivid warning effect, and make the security warning more effective.

In conclusion, by adjusting the display state of the virtual object, the user can better understand the potential danger and take an appropriate action to avoid or reduce the potential harm. This technology can provide a more immersive and interactive experience, and make the security warning more vivid and effective.

In some embodiments, the presenting a visual indication for security warning further comprises:

when the target entity is blocked by a plurality of virtual objects, removing the plurality of virtual objects from the physical environment, to reveal the target entity.

When the target entity is blocked by the plurality of virtual objects, the system removes the virtual objects from the physical environment. This can ensure that the user can see the target entity through the removed virtual objects, thereby better understanding the potential danger.

Figure 9:
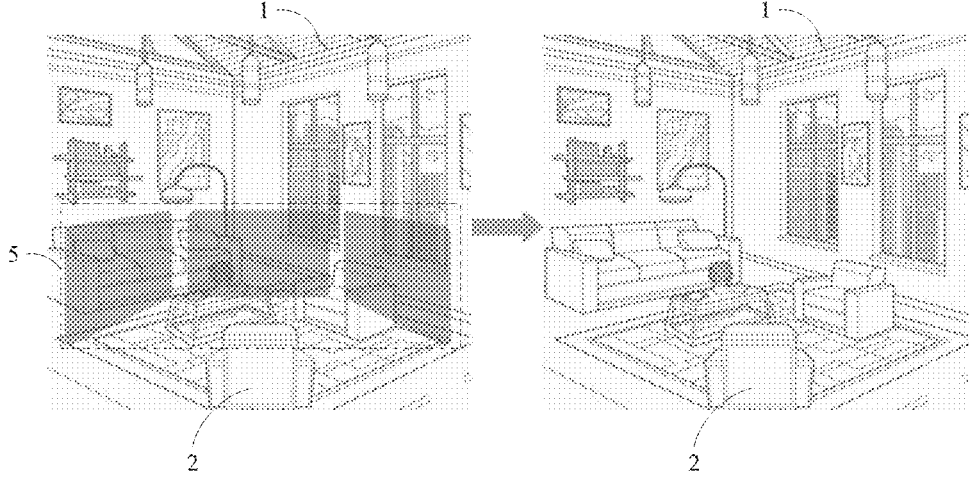
FIG. 9 is a schematic diagram of an eighth application scenario of the security prompt method according to an embodiment of the present application.

As shown in FIG. 9, when the target entity 2 is blocked by the plurality of virtual objects 5 (as shown in a left diagram of FIG. 9), the system removes the plurality of virtual objects 5 from the physical environment 1, that is, clears all virtual objects in the field of view, to reveal the target entity 2 (as shown in a right diagram of FIG. 9).

The operation of removing the virtual objects may be performed based on an interactive behavior of the user or a determination of the system. For example, if the user is approaching a target entity blocked by the plurality of virtual objects, the system may automatically recognize and remove the virtual objects, so that the user can clearly see the target entity.

The operation of removing the virtual objects can provide a more intuitive and vivid warning effect, and make the security warning more effective. In addition, the operation can also help the user better understand the potential danger in the physical environment, and take an appropriate action to avoid or reduce the potential harm.

In conclusion, by removing the blocking virtual objects, the system can help the user better understand the potential danger and take an appropriate action to avoid or reduce the potential harm. This technology can provide a more immersive and interactive experience, and make the security warning more vivid and effective.

In the embodiments of the present application, the danger levels of the entities in the physical environment are dynamically classified based on the environmental data and the pose data of the user in a limited space, to achieve dynamic adaptation of the security area, and the range of movement of the user is not limited, thereby improving the quality of the virtual reality experience.

The size of the security area determines the range of movement of the user in the virtual reality experience. In the embodiments of the present application, the dynamic adaptation of the security area is implemented by dynamically classifying the entities in the physical environment into danger levels based on the environmental data and the pose data of the user, the security area can be set reasonably, and potential dangerous situations in which the user collides with furniture, a wall, or another obstacle in reality can be effectively avoided, thereby improving the security.

In the embodiments of the present application, the dynamic adaptation of the security area is implemented by dynamically classifying the entities in the physical environment into danger levels based on the environmental data and the pose data of the user, which can break the limitation of a social interaction space of the user and other people in virtual reality, thereby improving the virtual reality social experience.

In the embodiments of the present application, the dynamic adaptation of the security area is implemented by dynamically classifying the entities in the physical environment into danger levels based on the environmental data and the pose data of the user, which can adapt to different security areas according to the requirements and adaptation degrees of different users for the virtual reality security area, thereby improving the adaptability.

In the embodiments of the present application, the user can see the physical environment blocked by the virtual object in the environment without being limited by the range of movement, thereby improving the security and improving the immersive experience of the user.

All the foregoing technical solutions may be combined in any manner to form an optional embodiment of the present application, which is not described herein again one by one.

In the embodiments of the present application, environmental data of a physical environment is acquired; pose data of a user is obtained; entities in the physical environment are classified into danger levels based on the environmental data and the pose data; and a visual indication for security warning is presented when a distance between a collider and a target entity belonging to a target danger level reaches a dangerous distance threshold, where the collider is constructed based on an interactor corresponding to the user. In the embodiments of the present application, the entities in the physical environment can be classified into the danger levels based on the environmental data and the pose data of the user, to achieve dynamic adaptation of the security area, the range of movement of the user is not limited, and when the distance between the collider and the target entity of the target danger level reaches the dangerous distance threshold, the visual indication for security warning is presented, thereby improving the security and improving the immersive experience of the user.

Figure 10:
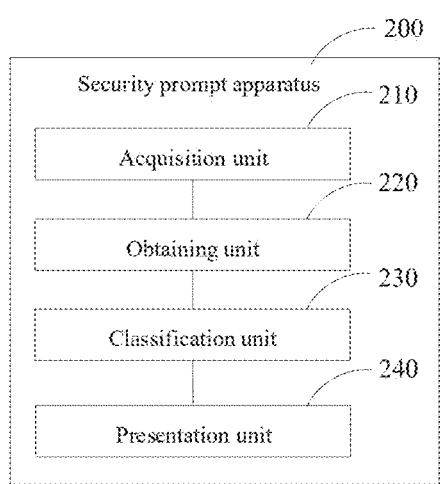
FIG. 10 is a schematic diagram of a structure of a security prompt apparatus according to an embodiment of the present application.

To facilitate better implementation of the security prompt method in the embodiments of the present application, the embodiments of the present application further provide a security prompt apparatus. Refer to FIG. 10, which is a schematic structural diagram of a security prompt apparatus according to an embodiment of the present application. The security prompt apparatus 200 may include:

an acquisition unit 210, configured to acquire environmental data of a physical environment;

an obtaining unit 220, configured to obtain pose data of a user;

a classification unit 230, configured to classify entities in the physical environment into danger levels based on the environmental data and the pose data;

a presentation unit 240, configured to present a visual indication for security warning when a distance between a collider and a target entity belonging to a target danger level reaches a dangerous distance threshold, where the collider is constructed based on an interactor corresponding to the user.

In some embodiments, the classification unit 230 includes:

a determination subunit, configured to determine a target size of the collider based on the environmental data and the pose data;

a classification subunit, configured to classify the entities in the physical environment into danger levels based on the environmental data and the target size.

In some embodiments, the determination subunit may be configured to:

perform scene segmentation based on preset pose data to determine a preset segmented scene, wherein the preset segmented scene at least comprises a fixed scene, a fine motion scene, and a moving scene;

determine a target scene based on the environmental data and the pose data, wherein the target scene is one of the preset segmented scenes;

determine the target size of the collider based on the target scene.

In some embodiments, the determination subunit may be configured to:

if the target scene is the fixed scene, determine the target size of the collider as a first size;

if the target scene is the fine motion scene, determine the target size of the collider as a second size;

if the target scene is the moving scene, determine the target size of the collider as a third size, wherein the first size is smaller than the second size, and the second size is smaller than the third size.

In some embodiments, the interactor comprises at least one sub-interactor, and the determination subunit may be configured to:

construct a sub-collider corresponding to each of the sub-interactors in the at least one interactor based on the at least one sub-interactor corresponding to the user, where all the sub-colliders constitute the collider;

determine a sub-target size of each of the sub-colliders based on the target scene, and determine the target size of the collider based on the sub-target sizes of all the sub-colliders.

In some embodiments, the determination subunit may be further configured to:

determine a second size relationship among the sub-target sizes of the sub-colliders in the same target scene based on a first size relationship among the sub-interactors, where the first size relationship is consistent with the second size relationship.

In some embodiments, the classification subunit may be configured to:

determine attribute information of the entities in the physical environment based on the environmental data, where the entities include an obstacle entity and a ground entity;

classify the entities in the physical environment into danger levels based on the target size and the attribute information of the entities, where the danger levels at least include a high-risk level, a medium-risk level, and a low-risk level.

In some embodiments, when classifying the entities in the physical environment into danger levels based on the target size and the attribute information of the entities, the classification subunit may be configured to:

determine a danger level of a first obstacle entity based on the target size and a sharp degree in attribute information of the obstacle entity; and determine a danger level of the ground entity based on the target size and an entity size in attribute information of a second obstacle entity located on the ground entity.

In some embodiments, the presentation unit 240 may be configured to:

display, in the physical environment, a virtual scene generated by a virtual reality device, where the virtual scene includes at least one virtual object;

display security warning prompt information in the virtual scene.

In some embodiments, the presentation unit 240 may be further configured to:

when the target entity is blocked by a first virtual object, adjust at least a part of the first virtual object to a see-through state, to reveal the target entity.

In some embodiments, the presentation unit 240 may be further configured to:

when the target entity is blocked by a plurality of virtual objects, remove the plurality of virtual objects from the physical environment, to reveal the target entity.

All or some of the units in the foregoing security prompt apparatus 200 may be implemented by software, hardware, or a combination thereof. The foregoing units may be embedded in or independent of a processor in a terminal device in the form of hardware, or may be stored in a memory in the terminal device in the form of software, so that the processor can call and execute operations corresponding to the foregoing units.

The security prompt apparatus 200 may be integrated in a terminal or a server that has a memory and a processor installed and has an operation capability, or the security prompt apparatus 200 is the terminal or the server.

In some embodiments, the present application further provides a terminal device. The terminal device includes a memory and a processor, a computer program is stored in the memory, and when the processor executes the computer program, the steps in the foregoing method embodiments are implemented.

Figure 11:
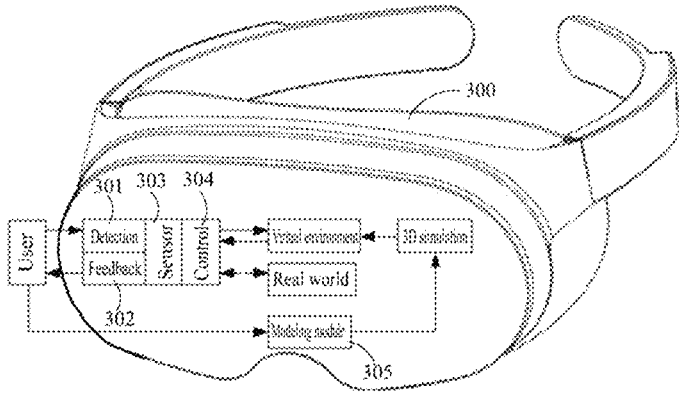
FIG. 11 is a schematic diagram of a first structure of a terminal device according to an embodiment of the present application.

As shown in FIG. 11, FIG. 11 is a schematic structural diagram of a terminal device according to an embodiment of the present application. The terminal device 300 can usually be provided in the form of glasses, a head mount display (HMD), or contact lenses, to implement visual perception and other forms of perception. Certainly, the form implemented by the terminal device is not limited thereto, and the terminal device can be further downsized or upsized as required. The terminal device 300 may include but is not limited to the following components:

a detection module 301: detects an operation command of a user by using various sensors, and applies the operation command to a virtual environment, for example, continuously updates an image displayed on a display screen according to a sight line of the user, to implement interaction between the user and a virtual scene, for example, continuously updates reality content based on a detected rotation direction of a head of the user.

A feedback module 302: receives data from the sensors, and provides real-time feedback for the user, where the feedback module 302 may be configured to display a graphical user interface, for example, display a virtual environment on the graphical user interface. For example, the feedback module 302 may include a display screen and the like.

Sensors 303: receive an operation command from the user, apply the operation command to the virtual environment, and provide a result generated after the operation to the user in various feedback forms.

A control module 304: controls the sensors and various input/output devices, including obtaining data (such as an action and a voice) of the user and outputting perception data, such as an image, vibration, temperature, and sound, to act on the user, the virtual environment, and the real world.

A modeling module 305: constructs a three-dimensional model of the virtual environment, and may further include various feedback mechanisms such as sound and touch in the three-dimensional model.

In the embodiments of the present application, a virtual scene may be constructed by the modeling module 305; the virtual scene generated by a virtual reality device is displayed by the feedback module 302, and the virtual scene includes at least one virtual object; the environmental data of the physical environment is acquired and the pose data of the user is obtained by the detection module 301 and the sensors 303; the entities in the physical environment are classified into danger levels by the control module 304 based on the environmental data and the pose data; and a visual indication for security warning is presented by the feedback module 302 when a distance between a collider and a target entity of a target danger level reaches a dangerous distance threshold.

Figure 12:
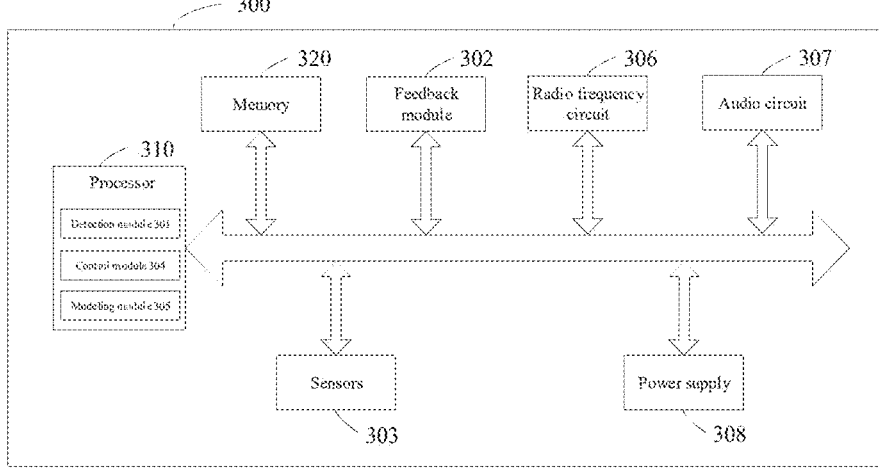
FIG. 12 is a schematic diagram of a second structure of a terminal device according to an embodiment of the present application.

In some embodiments, as shown in FIG. 12, FIG. 12 is a schematic diagram of another structure of a terminal device according to an embodiment of the present application. The terminal device 300 further includes a processor 310 with one or more processing cores, a memory 320 with one or more computer-readable storage media, and a computer program stored on the memory 320 and executable on the processor. The processor 310 is electrically connected to the memory 320. A person skilled in the art may understand that the structure of the terminal device shown in the figure does not constitute a limitation on the terminal device, and the terminal device may include more or fewer components than those shown in the figure, or some components may be combined, or the components may be arranged differently.

The processor 310 is a control center of the terminal device 300, and is connected to all parts of the entire terminal device 300 through various interfaces and lines. The processor 310 executes various functions of the terminal device 300 and processes data by running or loading a software program and/or module stored in the memory 320, and invoking data stored in the memory 320, to monitor the terminal device 300 as a whole.

In the embodiments of the present application, the processor 310 in the terminal device 300 loads an instruction corresponding to a process of one or more application programs into the memory 320 according to the following steps, and runs the application program stored in the memory 320 by the processor 310, to implement various functions:

acquire environmental data of a physical environment; obtain pose data of a user; classify entities in the physical environment into danger levels based on the environmental data and the pose data; and present a visual indication for security warning when a distance between a collider and a target entity belonging to a target danger level reaches a dangerous distance threshold, where the collider is constructed based on an interactor corresponding to the user.

For a specific implementation of each of the foregoing operations, refer to the foregoing embodiments, and details are not described herein again.

In some embodiments, the processor 310 may include the detection module 301, the control module 304, and the modeling module 305.

In some embodiments, as shown in FIG. 12, the terminal device 300 further includes a radio frequency circuit 306, an audio circuit 307, and a power supply 308. The processor 310 is electrically connected to the memory 320, the feedback module 302, the sensors 303, the radio frequency circuit 306, the audio circuit 307, and the power supply 308. A person skilled in the art may understand that the structure of the terminal device shown in FIGS. 11 and 12 does not constitute a limitation on the terminal device, and the terminal device may include more or fewer components than those shown in the figure, or some components may be combined, or the components may be arranged differently.

The radio frequency circuit 306 may be configured to receive and transmit a radio frequency signal, to establish a wireless communication with a network device or another terminal device through wireless communication, and to send and receive a signal with the network device or the other terminal device.

The audio circuit 307 may be configured to provide an audio interface between a user and the terminal device through a speaker and a microphone. The audio circuit 307 may transmit an electrical signal converted from received audio data to the speaker, and the speaker converts the electrical signal into a sound signal for output. In addition, the microphone converts a collected sound signal into an electrical signal. The audio circuit 307 receives the electrical signal and converts the electrical signal into audio data, and then outputs the audio data to the processor 310 for processing. The audio data is transmitted to, for example, another terminal device through the radio frequency circuit 306, or is output to the memory for further processing. The audio circuit 307 may further include an earphone jack to provide communication between an external earphone and the terminal device.

The power supply 308 is configured to supply power to each of the components of the terminal device 300.

Although not shown in FIG. 11 or FIG. 12, the terminal device 300 may further include a camera, a Wi-Fi module, a Bluetooth module, an input module, and the like, which are not described herein again.

In some embodiments, the present application further provides a computer-readable storage medium, configured to store a computer program. The computer-readable storage medium may be applied to a terminal device or a server, and the computer program enables the terminal device or the server to perform a corresponding procedure in the security prompt method in the embodiments of the present application. For brevity, details are not described herein again.

In some embodiments, the present application further provides a computer program product. The computer program product includes a computer program, and the computer program is stored in a computer-readable storage medium. A processor of a terminal device reads the computer program from the computer-readable storage medium, and the processor executes the computer program, so that the terminal device performs a corresponding procedure in the security prompt method in the embodiments of the present application. For brevity, details are not described herein again.

The present application further provides a computer program. The computer program includes a computer program, and the computer program is stored in a computer-readable storage medium. A processor of a terminal device reads the computer program from the computer-readable storage medium, and the processor executes the computer program, so that the terminal device performs a corresponding procedure in the security prompt method in the embodiments of the present application. For brevity, details are not described herein again.

It should be understood that a processor in the embodiments of the present application may be an integrated circuit chip, and has a signal processing capability. In the implementation process, each step of the foregoing method embodiments may be completed by an integrated logic circuit of hardware in the processor or an instruction in a form of software. The foregoing processor may be a general-purpose processor, a digital signal processor (Digital Signal Processor, DSP), an application-specific integrated circuit (Application Specific Integrated Circuit, ASIC), a ready-made programmable gate array (Field Programmable Gate Array, FPGA) or another programmable logic device, a discrete gate or transistor logic device, or a discrete hardware component. The methods, steps, and logical block diagrams disclosed in the embodiments of the present application may be implemented or executed. The general-purpose processor may be a microprocessor, or the processor may be any conventional processor, and the like. The steps of the method disclosed in combination with the embodiments of the present application may be directly embodied as being executed and completed by a hardware decoding processor, or may be completed by a combination of hardware and software modules in the decoding processor. The software module may be located in a mature storage medium in the art, such as a random access memory, a flash memory, a read-only memory, a programmable read-only memory, an electrically erasable programmable read-only memory, or a register. The storage medium is located in a memory, and the processor reads information in the memory and completes the steps of the foregoing method in combination with hardware thereof.

It may be understood that a memory in the embodiments of the present application may be a volatile memory or a non-volatile memory, or may include both a volatile memory and a non-volatile memory. The non-volatile memory may be a read-only memory (ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM), which is used as an external cache. By way of example but not limitation, many forms of RAM are available, such as a static random-access memory (Static RAM, SRAM), a dynamic random-access memory (Dynamic RAM, DRAM), a synchronous dynamic random-access memory (Synchronous DRAM, SDRAM), a double data rate synchronous dynamic random-access memory (Double Data Rate SDRAM, DDR SDRAM), an enhanced synchronous dynamic random-access memory (Enhanced SDRAM, ESDRAM), a synchlink dynamic random-access memory (Synchlink DRAM, SLDRAM), and a direct rambus random-access memory (Direct Rambus RAM, DR RAM). It should be noted that the memory in the systems and methods described herein is intended to include but is not limited to these and any other suitable types of memories.

A person of ordinary skill in the art may be aware that the units and algorithm steps of each example described in combination with the embodiments disclosed herein may be implemented in electronic hardware, or a combination of computer software and electronic hardware. Whether these functions are performed in hardware or software depends on a specific application and design constraint conditions of the technical solutions. A person skilled in the art may use different methods to implement the described functions for each specific application, but it should not be considered that the implementation goes beyond the scope of the present application.

A person skilled in the art may clearly understand that for the convenience and brevity of description, for a specific working process of the foregoing system, apparatus, and unit, reference may be made to a corresponding process in the foregoing method embodiments, and details are not described herein again.

In the embodiments of the present application, the term "module" or "unit" refers to a computer program or a part of the computer program with a predetermined function, and works with other related parts to achieve a predetermined goal, and may be implemented in whole or in part by using software, hardware (such as a processing circuit or a memory), or a combination thereof. Similarly, one processor (or a plurality of processors or memories) may be used to implement one or more modules or units. In addition, each module or unit may be a part of an overall module or unit that contains the function of the module or unit.

In several embodiments provided in the present application, it should be understood that the disclosed system, apparatus, and method may be implemented in other manners. For example, the foregoing apparatus embodiments are merely illustrative. For example, the division of the units is merely logical function division, and there may be another division manner in actual implementation. For example, a plurality of units or components may be combined or integrated into another system, or some features may be ignored or not performed. In addition, the displayed or discussed coupling or direct coupling or communication connection between each other may be implemented through some interfaces. The indirect coupling or communication connection among the apparatuses or units may be electrical, mechanical or in other forms.

The units described as separate parts may or may not be physically separate, and parts displayed as units may or may not be physical units, and may be located at one position, or may be distributed on a plurality of network units. Some or all of the units may be selected according to actual needs to achieve the objective of the solution of the embodiments.

In addition, each of the functional units in the embodiments of the present application may be integrated into one processing unit, or each of the units may exist alone physically, or two or more units are integrated into one unit. If the functions are implemented in the form of software functional units and sold or used as independent products, the functions may be stored in a computer-readable storage medium. Based on such an understanding, the essence or the part contributing to the prior art of the technical solutions of the present application, or part of the technical solutions, may be embodied in the form of a software product. The computer software product is stored in a storage medium and includes several instructions for instructing a terminal device (which may be a personal computer or a server) to perform all or some of the steps of the methods described in the embodiments of the present application. The foregoing storage medium includes: various media that can store program codes, such as a USB flash drive, a mobile hard disk, a ROM, a RAM, a magnetic disk, or an optical disk.

The foregoing descriptions are merely specific implementations of the present application, but are not intended to limit the protection scope of the present application. Any person skilled in the art can easily think of changes or replacements within the technical scope disclosed in the present application, and all of them shall fall within the protection scope of the present application. Therefore, the protection scope of the present application shall be subject to the protection scope of the claims.

What is claimed is:

1. A security prompt method, comprising:
acquiring environmental data of a physical environment;
obtaining pose data of a user;
determining a target size of a collider based on the pose data;
classifying entities in the physical environment into danger levels based on the environmental data and the target size; and
presenting a visual indication for security warning when a distance between the collider and a target entity of a target danger level reaches a danger distance threshold, wherein the collider is configured to represent an interaction area of an interactor corresponding to the user.

2. The security prompt method according to claim 1, wherein the target size of the collider is determined based on the environmental data and the pose data.

3. The security prompt method according to claim 1, wherein the determining the target size of the collider based on the environmental data and the pose data comprises:
performing scene segmentation based on preset pose data to determine preset segmented scenes, wherein the preset segmented scenes at least comprise a fixed scene, a fine motion scene, and a moving scene;
determining a target scene based on the environmental data and the pose data, wherein the target scene is one of the preset segmented scenes;
determining the target size of the collider based on the target scene.

4. The security prompt method according to claim 3, wherein the determining the target size of the collider based on the target scene comprises:
if the target scene is the fixed scene, determining the target size of the collider as a first size;
if the target scene is the fine motion scene, determining the target size of the collider as a second size;
if the target scene is the moving scene, determining the target size of the collider as a third size,
wherein the first size is smaller than the second size, and the second size is smaller than the third size.

5. The security prompt method according to claim 3, wherein the interactor comprises at least one sub-interactor, and the determining the target size of the collider based on the target scene comprises:
constructing a sub-collider corresponding to each of the sub-interactors of the at least one sub-interactor based on the at least one sub-interactor corresponding to the user, wherein all the sub-colliders form the collider;
determining a sub-target size of each of the sub-colliders based on the target scene, and determining the target size of the collider based on the sub-target sizes of all the sub-colliders.

6. The security prompt method according to claim 5, wherein the method further comprises:
determining a second size relationship among the sub-target sizes of the sub-colliders based on a first size relationship among the sub-interactors in the same target scene, wherein the first size relationship is consistent with the second size relationship.

7. The security prompt method according to claim 1, wherein the classifying the entities in the physical environment into the danger levels based on the environmental data and the target size comprises:
determining attribute information of the entities in the physical environment based on the environmental data, wherein the entities comprise obstacle entities and ground entities;
classifying the entities in the physical environment into the danger levels based on the target size and the attribute information of the entities, wherein the danger levels at least comprise a high-risk level, a medium-risk level, and a low-risk level.

8. The security prompt method according to claim 7, wherein the classifying the entities in the physical environment into the danger levels based on the target size and the attribute information of the entities comprises:
determining the danger level of a first obstacle entity based on the target size and a sharp degree in attribute information of the obstacle entity;
determining the danger level of a ground entity based on the target size and an entity size in attribute information of a second obstacle entity located on the ground entity.

9. The security prompt method according to claim 1, wherein the presenting the visual indication for the security warning comprises:
displaying a virtual scene generated by a virtual reality device in the physical environment, wherein the virtual scene comprises at least one virtual object;

displaying security warning prompt information in the virtual scene.

10. The security prompt method according to claim 9, wherein the presenting the visual indication for the security warning further comprises:

when the target entity is blocked by a first virtual object, adjusting at least a part of the first virtual object to a see-through state to expose the target entity.

11. The security prompt method according to claim 9, wherein the presenting the visual indication for the security warning further comprises:

when the target entity is blocked by a plurality of virtual objects, removing the plurality of virtual objects from the physical environment to expose the target entity.

12. A non-transitory computer-readable storage medium, wherein the computer-readable storage medium stores a computer program, and the computer program is suitable for a processor to load to perform a security prompt method comprising:

acquiring environmental data of a physical environment;

obtaining pose data of a user;

determining a target size of a collider based on the pose data;

classifying entities in the physical environment into danger levels based on the environmental data and the target size; and presenting a visual indication for security warning when a distance between the collider and a target entity of a target danger level reaches a danger distance threshold, wherein the collider is configured to represent an interaction area of an interactor corresponding to the user.

13. The non-transitory computer-readable storage medium according to claim 12, wherein the target size of the collider is determined based on the environmental data and the pose data.

14. The non-transitory computer-readable storage medium according to claim 12, wherein the determining the target size of the collider based on the environmental data and the pose data comprises:

performing scene segmentation based on preset pose data to determine preset segmented scenes, wherein the preset segmented scenes at least comprise a fixed scene, a fine motion scene, and a moving scene;

determining a target scene based on the environmental data and the pose data, wherein the target scene is one of the preset segmented scenes;

determining the target size of the collider based on the target scene.

15. The non-transitory computer-readable storage medium according to claim 14, wherein the determining the target size of the collider based on the target scene comprises:

if the target scene is the fixed scene, determining the target size of the collider as a first size;

if the target scene is the fine motion scene, determining the target size of the collider as a second size;

if the target scene is the moving scene, determining the target size of the collider as a third size, wherein the first size is smaller than the second size, and the second size is smaller than the third size.

16. The non-transitory computer-readable storage medium according to claim 14, wherein the interactor comprises at least one sub-interactor, and the determining the target size of the collider based on the target scene comprises:

constructing a sub-collider corresponding to each of the sub-interactors of the at least one sub-interactor based on the at least one sub-interactor corresponding to the user, wherein all the sub-colliders form the collider;

determining a sub-target size of each of the sub-colliders based on the target scene, and determining the target size of the collider based on the sub-target sizes of all the sub-colliders.

17. A terminal device, comprising a processor and a memory, the memory stores a computer program, and the processor, by invoking the computer program stored in the memory, is configured to perform the security prompt method comprising:

acquiring environmental data of a physical environment;

obtaining pose data of a user;

determining a target size of a collider based on the pose data;

classifying entities in the physical environment into danger levels based on the environmental data and the target size; and presenting a visual indication for security warning when a distance between the collider and a target entity of a target danger level reaches a danger distance threshold, wherein the collider is configured to represent an interaction area of an interactor corresponding to the user.

18. The terminal device according to claim 17, wherein the target size of the collider is determined based on the environmental data and the pose data.

19. The terminal device according to claim 17, wherein the determining the target size of the collider based on the environmental data and the pose data comprises:

performing scene segmentation based on preset pose data to determine preset segmented scenes, wherein the preset segmented scenes at least comprise a fixed scene, a fine motion scene, and a moving scene;

determining a target scene based on the environmental data and the pose data, wherein the target scene is one of the preset segmented scenes;

determining the target size of the collider based on the target scene.

20. The terminal device according to claim 19, wherein the determining the target size of the collider based on the target scene comprises:

if the target scene is the fixed scene, determining the target size of the collider as a first size;

if the target scene is the fine motion scene, determining the target size of the collider as a second size;

if the target scene is the moving scene, determining the target size of the collider as a third size, wherein the first size is smaller than the second size, and the second size is smaller than the third size.

* * * * *